United States Patent
Coney et al.

(10) Patent No.: US 8,561,924 B2
(45) Date of Patent: Oct. 22, 2013

(54) COOLING ARRANGEMENT

(75) Inventors: Michael H Coney, Derby (GB);
Andrew J Mullender, Nottingham (GB)

(73) Assignee: Rolls-Royce PLC, London (GB)

(*) Notice: Subject to any disclaimer, the term of this patent is extended or adjusted under 35 U.S.C. 154(b) by 1049 days.

(21) Appl. No.: 12/076,076

(22) Filed: Mar. 13, 2008

(65) Prior Publication Data
US 2008/0223961 A1 Sep. 18, 2008

(30) Foreign Application Priority Data

Mar. 16, 2007 (GB) .................................. 0705050.3

(51) Int. Cl.
*F24H 9/12* (2006.01)
*B05B 1/00* (2006.01)
*B05B 15/00* (2006.01)
*B05B 1/34* (2006.01)

(52) U.S. Cl.
USPC ........... 239/598; 239/480; 239/546; 239/569; 138/137

(58) Field of Classification Search
USPC ................. 239/509, 597–601, 589, 546, 103, 239/114–118, 480, 569, 571, 579, 581.2, 239/582.2, 582.1, 583, 585; 138/37, 40–46
See application file for complete search history.

(56) References Cited

U.S. PATENT DOCUMENTS

| | | | | |
|---|---|---|---|---|
| 1,509,453 A | * | 9/1924 | Trudel | 366/176.4 |
| 1,616,819 A | | 2/1927 | Norris | |
| 2,705,829 A | * | 4/1955 | Mock | 29/890.128 |
| 3,545,896 A | * | 12/1970 | Zahradnik | 417/471 |
| 3,731,517 A | | 5/1973 | Johnson | |
| 4,210,286 A | | 7/1980 | Smitherman | |
| 4,231,520 A | * | 11/1980 | Waldrum | 239/171 |
| 4,649,886 A | * | 3/1987 | Igashira et al. | 123/498 |
| 6,220,952 B1 | * | 4/2001 | Taylor et al. | 452/173 |

FOREIGN PATENT DOCUMENTS

| | | |
|---|---|---|
| BE | 382286 | 9/1931 |
| CA | 1307811 C | 9/1992 |
| DE | 2 409 544 | 9/1974 |
| DE | 298 09 680 U1 | 8/1998 |
| EP | 0 174 758 A2 | 3/1986 |
| EP | 0 253 605 A2 | 1/1988 |
| GB | 241424 | 10/1925 |
| NL | 7 102 181 | 8/1971 |
| WO | WO 01/77555 A1 | 10/2001 |
| WO | WO 2004/105957 A1 | 12/2004 |
| WO | WO 2005/105403 A1 | 11/2005 |

* cited by examiner

*Primary Examiner* — Len Tran
*Assistant Examiner* — Justin Jonaitis
(74) *Attorney, Agent, or Firm* — Oliff and Berridge, PLC

(57) ABSTRACT

A pipe for carrying a fluid, having a longitudinal axis and defining a radial aperture for release of a jet of fluid having a radial direction component α, the aperture having an aspect ratio greater than 2 and arranged with its elongate axis within 30 degrees of the longitudinal axis and having area greater than 0.2 the cross-sectional area of the pipe, the fluid jet having an angle α between 30 and 80 degrees from the longitudinal axis.

17 Claims, 3 Drawing Sheets

COOLING ARRANGEMENT

The present invention relates to a fluid supply pipe arranged to direct a jet of fluid at a particular angle through an opening in its wall particularly, but not exclusively, for cooling components or forming a desirable fluid flow regime.

In a conventional gas turbine engine an annular fire zone is defined between a core engine casing and an aerodynamic cowling. It is a requirement to ventilate the fire zone to prevent build up of fumes. Engine accessories are housed within the cowling and require cooling. Currently, air is directed into the fire zone using straight or bent pipes. The air cools components and ventilates the fire zone. The air may be directed either circumferentially around the fire zone or more usually in generally axial direction. This prior art solution is effective but requires space to implement and is relatively heavy. Furthermore, the core engine casing is prone to high vibrations that cause longevity problems particularly to bent pipes.

During engine or component development there is a need to alter airflow jet angles to finely adjust the air flow pattern within the fire zone. It is particularly important to avoid recirculation patterns forming and therefore the ability to finely adjust ventilation air jet angles is highly advantageous.

During an in-service flight cycle the cooling requirements of components change. Current ventilation/cooling pipes arrangements are fixed, catering for the worst case scenario and are therefore inefficient when less cooling is required.

Therefore it is an object of the present invention to optimise the ventilation/cooling flow, avoiding bends in pipes and preferably provide an arrangement that comprises adjustable jet angles for changes to cooling requirements.

In accordance with the present invention a pipe for carrying a fluid, having a longitudinal axis and defining a radial aperture for release of a jet of fluid having a radial direction component, the aperture having an aspect ratio greater than 2 and arranged with its elongate axis within 30 degrees of the longitudinal axis and having area greater than 0.2 the cross-sectional area of the pipe, the fluid jet having an angle α between 30 and 80 degrees from the longitudinal axis.

Optionally, a second aperture is provided and comprises a different aspect ratio and a different area and therefore a second fluid jet has a different angle than jet that of the first aperture.

Preferably, the pipe comprises adjustment means to vary the aspect ratio and/or the area of at least one aperture thereby changing the angle of the fluid jet.

Preferably, the adjustment means comprises a translatable piston within the pipe and translatable along its axis to thereby vary the length of the aperture.

The adjustment means may comprises a rotatable sleeve or the adjustment means may comprises a slidable sleeve.

Preferably, an actuator is provided to move the adjustment means.

Preferably, electronics are provided to control the actuator and vary the aperture's aspect ratio and area to selectively adjust the angle of the fluid dependent upon requirements.

According to another aspect of the present invention a method of changing the angle of a jet of fluid from a radial aperture in a pipe comprises the step of varying the area of the aperture via an adjustment means.

The present invention will be more fully described by way of example with reference to the accompanying drawings in which.

Figure 1:
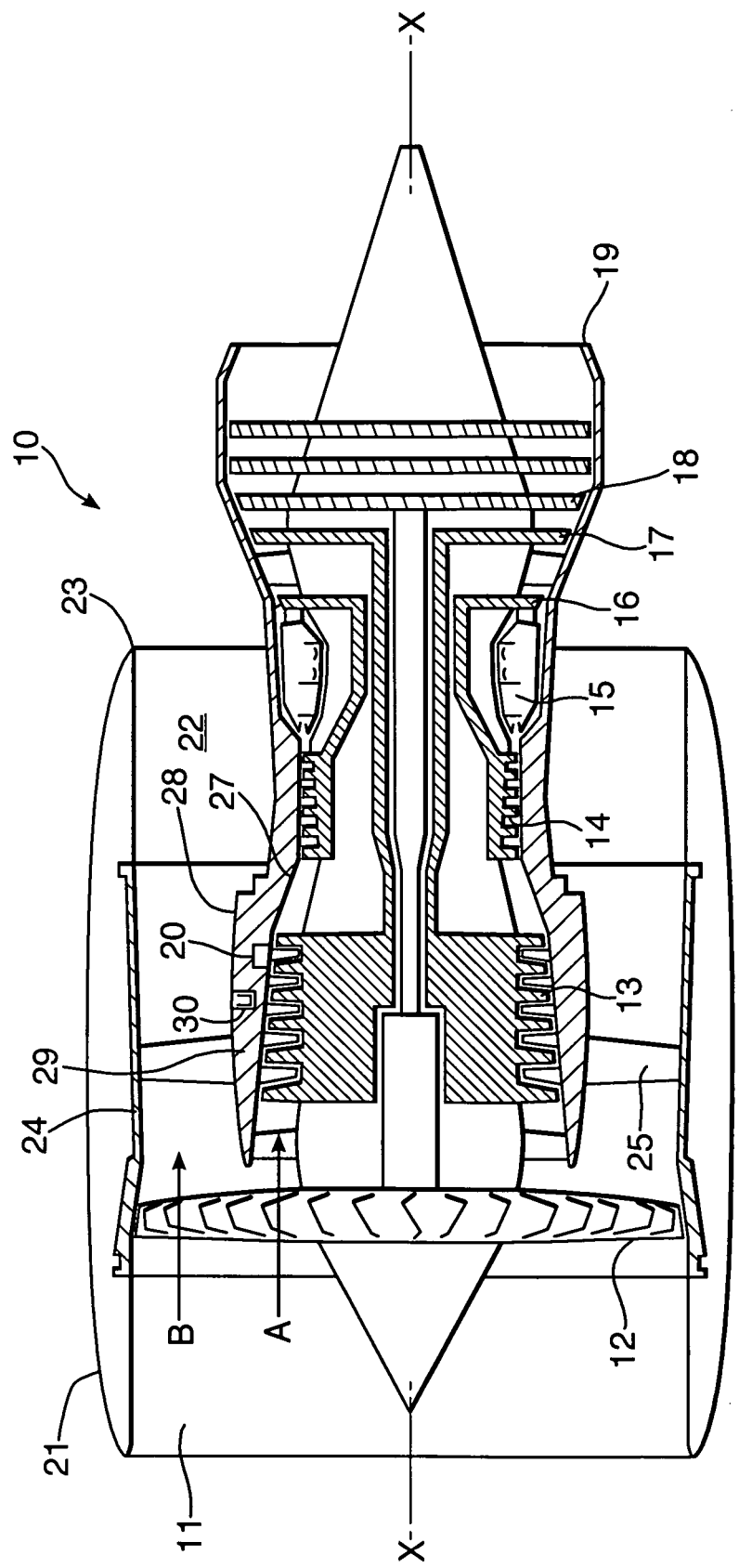
FIG. 1 is a schematic section of part of a ducted fan gas turbine engine attached to an aircraft structure.

Referring to FIG. 1, a ducted fan gas turbine engine generally indicated at 10 has a principal and rotational axis XX. The engine 10 is attached to an aircraft, usually to a wing or fuselage, via a pylon.

The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core exhaust nozzle 19. A nacelle 21 generally surrounds the engine 10 and comprises the intake 11, two generally C-shaped ducts, which define bypass ducts 22, and an exhaust nozzle 23.

The gas turbine engine 10 works in the conventional manner so that air entering the intake 11 is accelerated by the fan 12 to produce two air flows: a first airflow A into the intermediate pressure compressor 13 and a second airflow B which passes through the bypass ducts 22 to provide propulsive thrust. The intermediate pressure compressor 13 compresses the airflow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The fan 12 is circumferentially surrounded by a structural member in the form of a fan casing 24, which is supported by an annular array of outlet guide vanes 25. Engine accessories such as the EEC 26 and oil tank are mounted on the fan casing 24.

The engine's core components are surrounded by a core casing 27 and radially outwardly a core fairing 28, which between them define a ventilation zone 29. Within the ventilation zone 29 accessories 20 are mounted. With ever increasing temperatures and powerful electronics, the importance of local thermal management for temperature sensitive accessories/components is paramount to their reliability.

One current arrangement comprises a number of bent pipes in which the ventilation/cooling fluid issues from the end of the pipe. The pipes direct cooling and ventilation fluid around each side to the annular ventilation zone 29. Whereas this is effective to a degree it requires space for the pipes and is relatively heavy. Further, the core engine casing is prone to high vibrations that cause particular problems to bent pipes. Furthermore, the pipes and therefore fluid flow regime around the ventilation zone 29 are difficult to adjust during development and often the solution to poor recirculation area is to use more cooling air, which is detrimental to the efficiency of the engine. Thus the prior art plain circular jets, fed by the high pressure air from the engine by-pass duct 22, offer only limited control in relation to local air distribution and levels of cooling.

The present invention is a pipe 30 having at least one radial aperture and configured to direct a jet of cooling fluid having a radial direction component. In this example the cooling fluid is air from the bypass duct 22. This pipe provides a broader distribution of cooling air, whilst retaining a simple and mechanically robust design.

Figure 2:
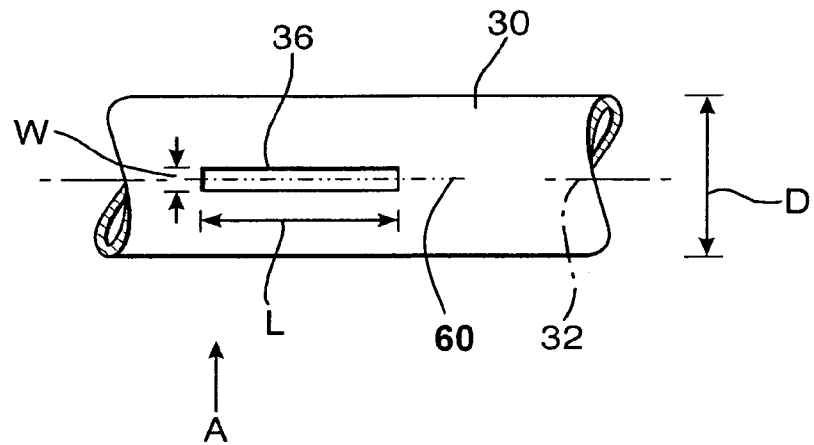
FIG. 2 is a view of a pipe defining an aperture in accordance with the present invention.
Figure 3:
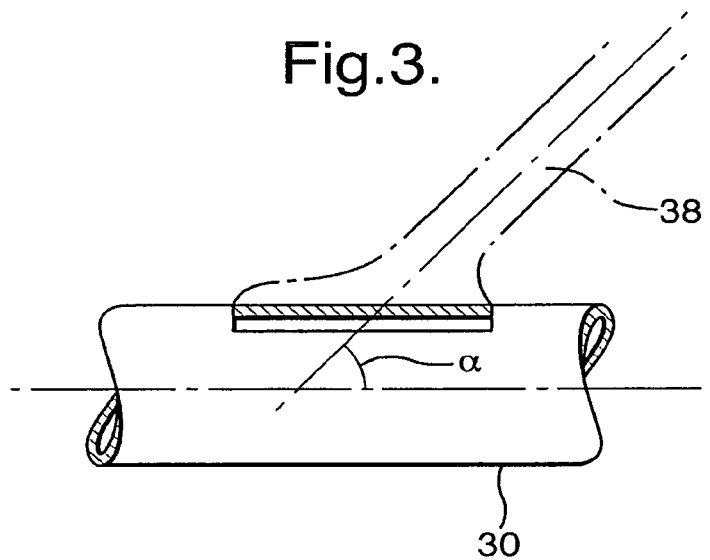
FIG. 3 is a view on arrow A in FIG. 2.

Referring to FIGS. 2 and 3, the pipe 30 carries a fluid along its longitudinal axis 32 and defines a radial aperture 36 for release of a jet of fluid 38 having a radial direction component, shown by angle $\alpha$. The pipe 30 has a diameter D and associated cross-sectional area. The aperture 36 has a length L and width W and is generally rectangular.

During development there is a need to alter airflow jet angles to finely adjust the air flow pattern around the fire/ventilation zone 29. It is particularly important to avoid recirculation patterns forming and therefore the ability to finely adjust ventilation air jet angles is highly advantageous.

It should be understood that this pipe may be any cross section shape without departing from the scope of the present invention. Further, the shape of the aperture 36 may be different from that described herein, although, the longer dimension (e.g., the elongate axis 60), should be orientated to within 30 degrees of the longitudinal axis 32 and preferably aligned therewith.

The Applicant has found that by selection of the aspect ratio of the aperture 36 and its area relationship with the cross-sectional area of the pipe 36, the angle $\alpha$ of the fluid jet 38 may be selected between 30 and 80 degrees from the longitudinal axis 32. The aperture 36 preferably has an aspect ratio greater than 2 and has an area greater than 0.2 the cross-sectional area of the pipe 36.

By way of example, a pipe 36 having an outer diameter D 22.2 mm, internal diameter 19.0 mm and defining an aperture W=3.0 mm and L=30 mm, area ration of 1.28, produced a jet angle $\alpha=45°$. Where L was reduced to 15 mm the area ratio being 0.60, the jet angle $\alpha=65°$.

In another study, the pipe 36 internal bore diameters were increased from 25 mm and 32 mm, whilst retaining the same aperture dimensions (3×30 mm). These area ratios of 0.74 and 0.45 generated jet angles of 62° and 71° respectively.

It was also observed that a small increase in jet angle, up to 2°, appeared to accompany increased a mass flow rate from 0.019 Kg/s to 0.025 Kg/s.

The present invention is also advantageous in that the pipe 30 may define a second aperture 36B that comprises a different aspect ratio and a different area and therefore a second fluid jet 38 having a different angle than the first aperture 36A.

Figure 4:
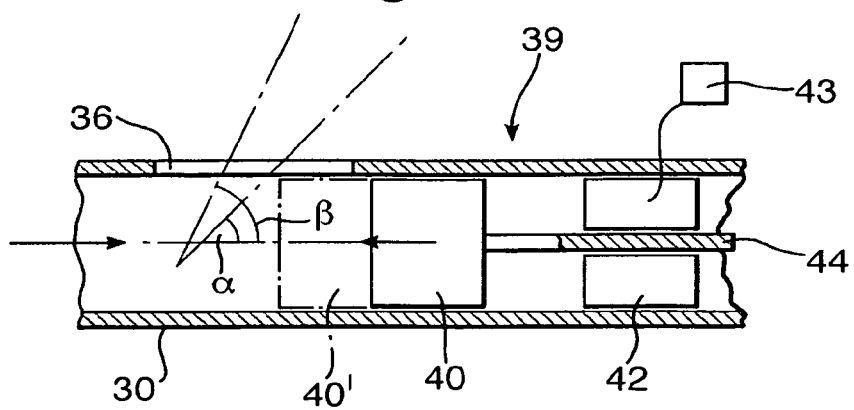
FIG. 4 is schematic section through a pipe arrangement having a means for adjusting the area of the aperture in accordance with the present invention.
Figure 5:
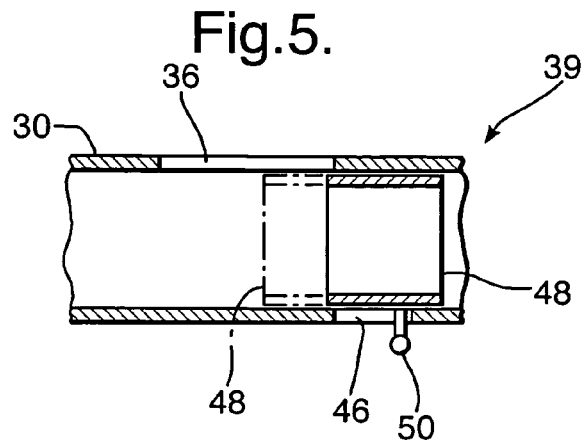
FIG. 5 is schematic section through an alternative pipe arrangement having a means for adjusting the area of the aperture in accordance with the present invention.
Figure 6:
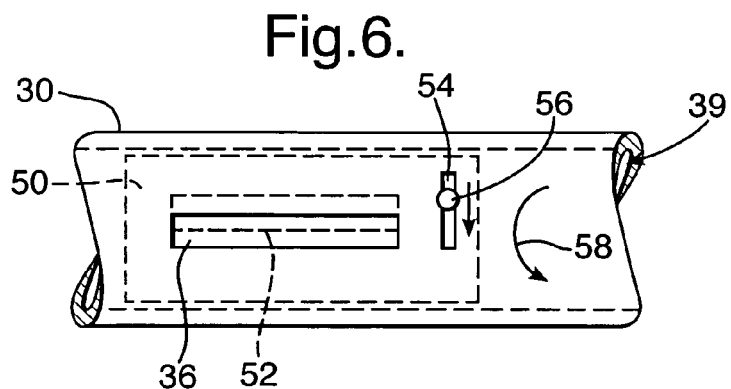
FIG. 6 is schematic section through a second alternative pipe arrangement having a means for adjusting the area of the aperture in accordance with the present invention.

Referring to FIGS. 4-6, the pipe arrangement 30 comprises adjustment means 39 to vary the aspect ratio and/or the area of at least one aperture 36A, 36B thereby changing the angle of the fluid jet 38 ejected from the aperture.

In FIG. 4, the adjustment means 39 comprises a translatable piston 40 within the pipe 30, which is translatable along its axis 32 to thereby vary the length L of the aperture(s) 36A, 36B. An actuator 42 is provided and is drivingly connected via a screw 44 to the piston 40. The piston 40 is solid and therefore all the fluid passing along the pipe 30 egresses the aperture 36 or multiple apertures. Alternatively, the piston 40 may be a hollow cylinder to allow fluid to pass thereby to other apertures.

Electronics 43 are provided to control the actuator 42 to vary the aperture's aspect ratio and area to selectively change the angle of the fluid jet 38 dependent upon requirements. This is particularly useful during testing where small adjustments in jet angle can create markedly different fluid flow patterns in the ventilation zone 29. Thus a test can be continuous whilst the aperture length is adjusted.

In FIG. 5, the adjustment means 39 is a slidable cover 48, which in this embodiment is in the form of a sleeve disposed within the pipe 30. Translation of the sleeve between a first position shown in solid as 48 and a second position shown dashed at 48' shortens the length L of the aperture 36, thereby adjusting the angle of the fluid jet.

In FIG. 6, the adjustment means 39 is a rotatable cover 50, which in this embodiment is an annular sleeve although it may be part circular or flat depending on the pipe's geometry. The sleeve 50 defines an opening 52 which is aligned with the aperture 36 initially allowing its full area. Rotation of the sleeve will reduce the width W of the aperture, adjusting the angle of the fluid jet 38.

A slot 54 is defined in the pipe 30, through which a rod 56 extends from the sleeve 50 enabling manual adjustment of the aperture's width W.

In a further embodiment, the sleeve 50 may be translated along the axis 32 and rotated to adjust the area, but maintain the aspect ratio of the aperture 36. This is easily achieved by use of a relatively loose helical slot 54 or alternatively a loose screw thread between the sleeve and internal surface of the pipe 30.

The alternative embodiments described with reference to FIGS. 5 and 6, are preferably less sophisticated versions of adjustment means 39, but may also comprise the actuator 42 and electronics. The sleeves 48, 50 may be either completely hollow to allow fluid to pass therethrough or may have a solid end wall to prevent the passage of fluid.

The present invention also lends itself to a method of adjusting the angle of a jet of fluid 38 from a radial aperture 36 in a pipe 30 comprising the step of varying the area of the aperture via an adjustment means 39.

Figure 7:
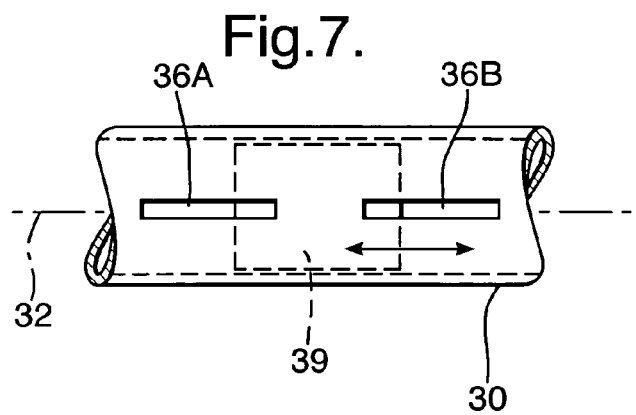
FIG. 7 is a view on a pipe having two apertures and an area adjustment means in accordance with the present invention.
Figure 8:
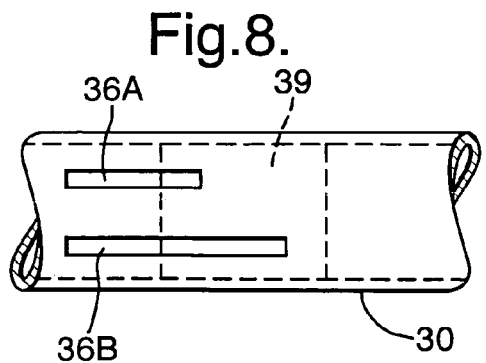
FIG. 8 is a view on a pipe having an alternative arrangement of the two apertures in FIG. 7 in accordance with the present invention.

Referring to FIGS. 7 and 9, show the pipe 30 having two apertures 36A and 36B. The apertures are of different lengths and therefore aspect ratios. The apertures could have different width as well of or instead of difference of length. Nonetheless, an adjustment means 39 is disposed such that is movement will differentially alter the aspect ratios of the two apertures 36A, 36B. In FIG. 7 the apertures are aligned along the axis 32 and in FIG. 8, they are generally parallel.

Although the apertures 36 are aligned generally parallel to the axis 32, they may be at an angle of up to 30 degrees and therefore in the form of a short helix.

It should be apparent to the skilled artisan that embodiments described herein may be combined, but are intended to be within the scope and spirit of the present invention.

We claim:

1. A cooling or ventilation fluid supply pipe arrangement for carrying a cooling or ventilation fluid, the arrangement comprising:

a cooling or ventilation fluid supply pipe having a longitudinal axis and defining a radial aperture for release of a jet of cooling or ventilation fluid, the jet having a central axis that radially extends at an angle $\alpha$ from the longitudinal axis, the radial aperture having an aspect ratio greater than 2, being arranged such that an elongate axis of the radial aperture is within 30 degrees of the longitudinal axis, and having an area greater than 0.2 a cross-sectional area of the pipe that is adjacent to the radial aperture, and the angle α being between 30 degrees and 80 degrees from the longitudinal axis depending on the aspect ratio.

2. A cooling or ventilation fluid supply pipe arrangement as claimed in claim 1, the cooling or ventilation fluid supply pipe defining a second aperture having a second aspect ratio different from the aspect ratio of the radial aperture, and a second area different from the area of the radial aperture, such that a second fluid jet ejecting from the second aperture has a second central axis that radially extends at an angle different from the angle α of the jet of the radial aperture.

3. A cooling or ventilation fluid supply pipe arrangement as claimed in claim 1, the cooling or ventilation fluid supply pipe including an adjustment means to vary at least one of the aspect ratio and the area of the radial aperture so as to change the angle α of the fluid jet.

4. A cooling or ventilation fluid supply pipe arrangement as claimed in claim 3, the adjustment means including a translatable piston disposed within the pipe, the piston being translatable along the longitudinal axis so as to vary a length of the radial aperture.

5. A cooling or ventilation fluid supply pipe arrangement as claimed in claim 3, the adjustment means including a rotatable sleeve.

6. A cooling or ventilation fluid supply pipe arrangement as claimed in claim 3, the adjustment means including a slidable sleeve.

7. A cooling or ventilation fluid supply pipe arrangement as claimed in claim 4, the cooling or ventilation fluid supply pipe further including an actuator that moves the adjustment means.

8. A cooling or ventilation fluid supply pipe arrangement as claimed in claim 7, further comprising electronics to control the actuator and vary the aspect ratio and area of the radial aperture to selectively adjust the angle α of the fluid jet dependent upon requirements.

9. A turbine engine, comprising:
a compressor that is configured to produce a jet of cooling or ventilation fluid; and
a cooling or ventilation fluid supply pipe that receives the jet, the pipe having a longitudinal axis and defining a radial aperture,
the compressor being configured to produce the jet and the radial aperture being configured to release the jet such that the jet has a central axis that radially extends at an angle α from the longitudinal axis,
the radial aperture having an aspect ratio greater than 2, being arranged such that an elongate axis of the radial aperture is within 30 degrees of the longitudinal axis, and having an area greater than 0.2 a cross-sectional area of the pipe, and
the angle α being between 30 degrees and 80 degrees from the longitudinal axis depending on the aspect ratio.

10. A turbine engine as claimed in claim 9, the cooling or ventilation fluid supply pipe defining a second aperture having a second aspect ratio different from the aspect ratio of the radial aperture, and a second area different from the area of the radial aperture, such that a second fluid jet ejecting from the second aperture has a second central axis that radially extends at an angle different from the angle α of the jet of the radial aperture.

11. A turbine engine as claimed in claim 9, the cooling or ventilation fluid supply pipe including an adjustment means to vary at least one of the aspect ratio and the area of the radial aperture so as to change the angle α of the fluid jet.

12. A turbine engine as claimed in claim 11, the adjustment means including a translatable piston disposed within the pipe, the piston being translatable along the longitudinal axis so as to vary a length of the radial aperture.

13. A turbine engine as claimed in claim 11, the adjustment means including a rotatable sleeve.

14. A turbine engine as claimed in claim 11, the adjustment means including a slidable sleeve.

15. A turbine engine as claimed in claim 12, the cooling or ventilation fluid supply pipe further including an actuator that moves the adjustment means.

16. A turbine engine as claimed in claim 15, further comprising electronics to control the actuator and vary the aspect ratio and area of the radial aperture to selectively adjust the angle α of the fluid jet dependent upon requirements.

17. A turbine engine as claimed in claim 9, the radial aperture having the area greater than 0.2 the cross-sectional area of the pipe that is adjacent to the radial aperture.

* * * * *